Patented Nov. 16, 1926.

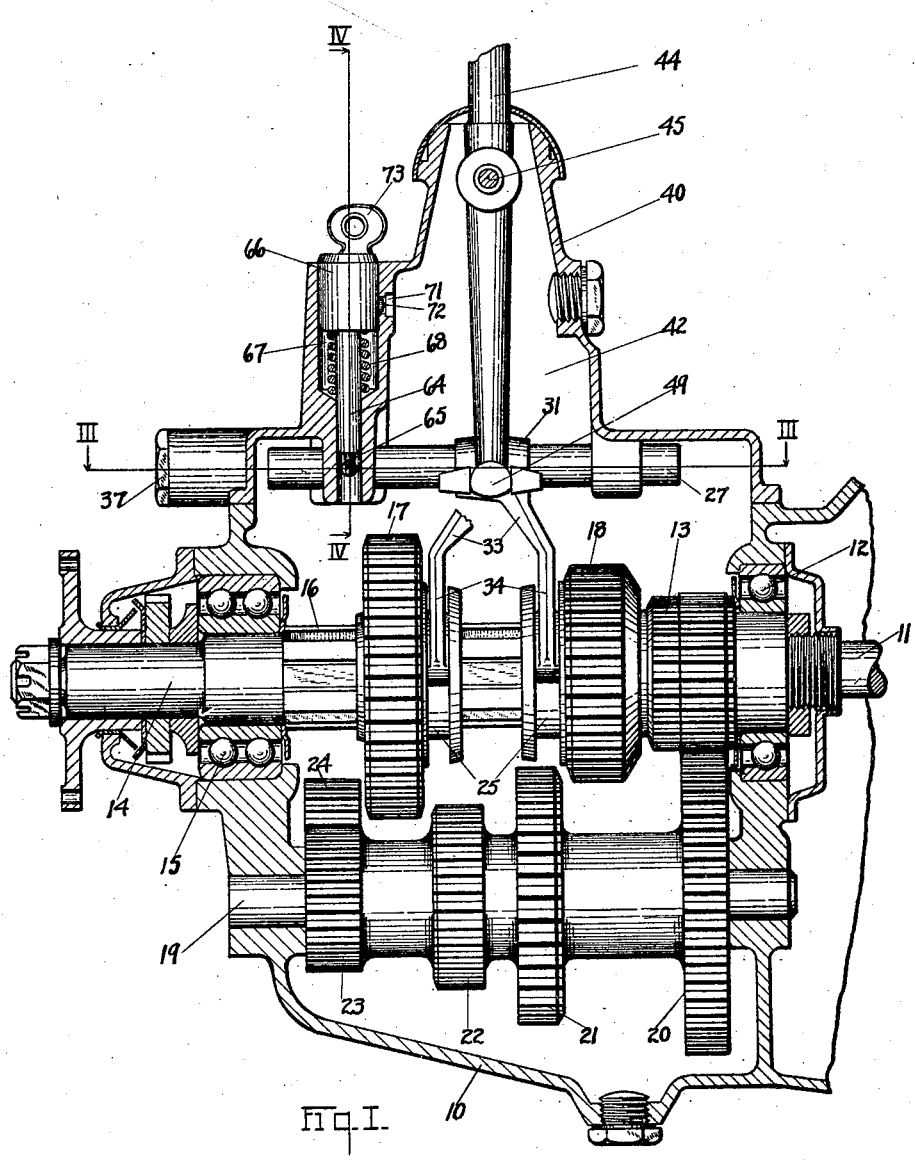

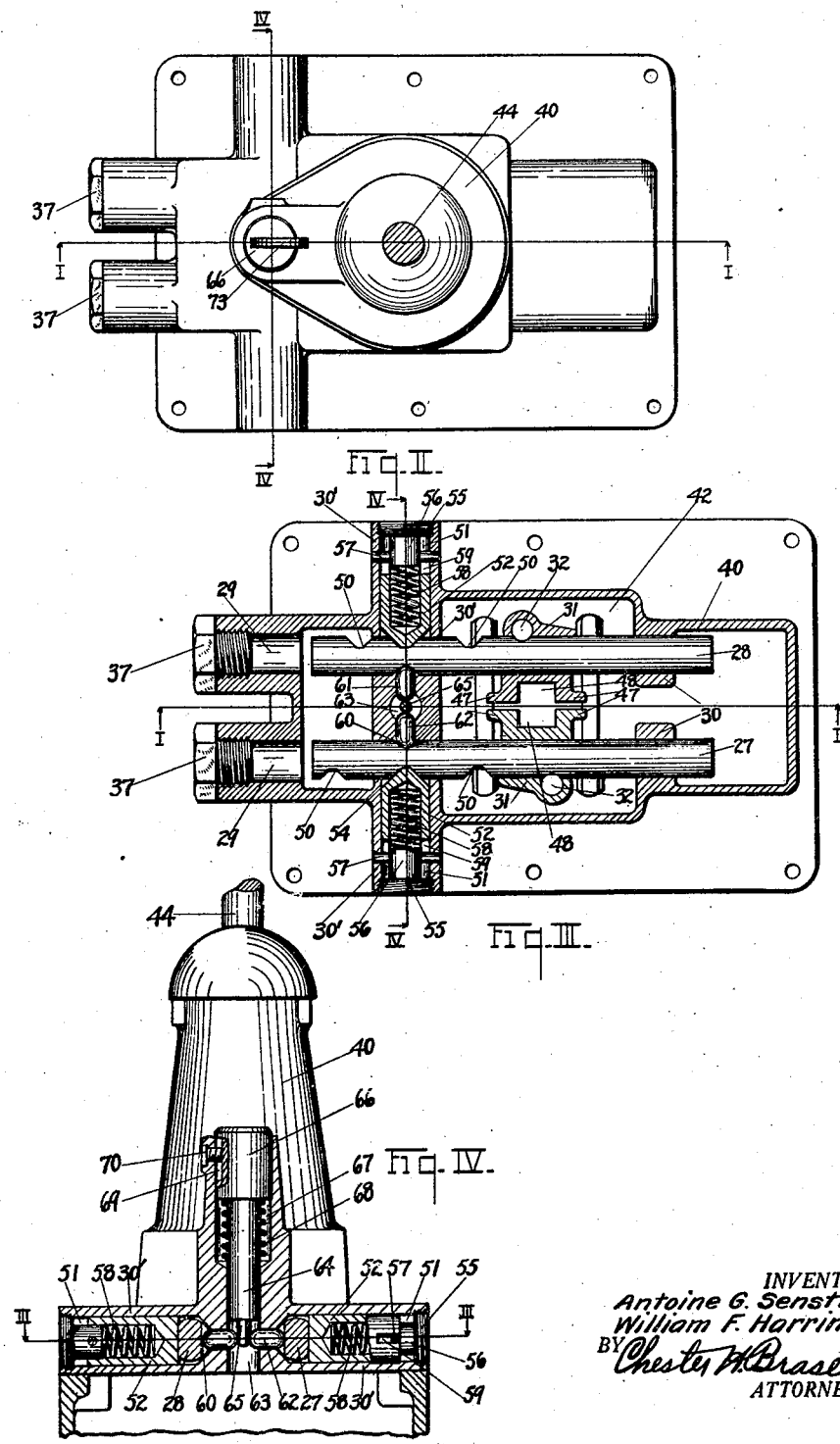

1,607,176

UNITED STATES PATENT OFFICE.

ANTOINE G. SENSTIUS AND WILLIAM F. HARRINGTON, OF TOLEDO, OHIO, ASSIGNORS TO THE WILLYS-OVERLAND COMPANY, OF TOLEDO, OHIO, A CORPORATION OF OHIO.

TRANSMISSION-LOCK MECHANISM FOR AUTOMOBILES.

Application filed April 8, 1919. Serial No. 288,441.

This invention relates to transmission lock mechanism for automobiles, and more especially to a mechanism adapted to lock the movable gears against movement when desired so as to prevent use of the automobile by an unauthorized person.

One object of the invention is to provide a mechanism of this character for locking the controlling mechanism in such a manner as to prevent movement of the slidable gears.

A further object of the invention is to provide a mechanism of the character described for positively retaining one of the movable gears in neutral position at all times.

A further object of the invention is to provide a mechanism of this character for preventing the engagement of more than one of the movable gears with one of the gears on the countershaft at any time, and at the same time providing means for locking the gear controlling mechanism.

A further object of the invention is to provide a mechanism of the character described, which is of simple construction and efficient in operation.

Further objects of this invention relate to economies of manufacture and details of construction, as will hereinafter appear from the detailed description to follow.

The objects of the invention are accomplished in one instance by the devices and means described in the following specification, but it is evident that the same may be varied widely without departing from the scope of the invention as pointed out in the appended claims.

A structure constituting one embodiment of the invention, which may be the preferred, is illustrated in the accompanying drawings forming a part hereof in which:

Figure I is a vertical, longitudinal section through the transmission casing of an automobile, taken along the line I—I of Figure II, showing the relative position of the operating mechanism with respect to the transmission shaft.

Figure II is a top plan view of the transmission casing showing the relative position of the control lever and the locking mechanism.

Figure III is a horizontal sectional view, taken along the line III—III of Figures I and IV, and illustrating the relative position of the various locking devices with respect to the control lever.

Figure IV is a vertical sectional view, taken along the line IV—IV of Figures I, II and III, and illustrating the relative position of the gear lock mechanism.

Similar reference characters refer to corresponding parts throughout the several views, and the sectional views are taken looking in the direction of the small arrows at the ends of the section lines.

Referring to the drawings, 10 indicates a transmission casing of the conventional type having a driving element or power shaft 11 extending within the casing, and rotatably mounted in a bearing 12 positioned in one end thereof. The driving element or power shaft is adapted to be operatively connected with an engine (not shown), and carries a driving pinion 13 firmly secured thereto within the casing. A drive shaft 14 is rotatably mounted in an anti-friction bearing 15 carried by the casing, and is so positioned as to be in axial alignment with the power shaft 11. The end of the drive shaft 14, which extends within the transmission casing is provided with a plurality of splines 16 so arranged as to permit movement of the movable gears 17 and 18 carried by the drive shaft in a direction longitudinally of the shaft, and at the same time prevent rotation of these gears with respect to the shaft. A countershaft 19 is also mounted in bearings carried by the casing, and is positioned substantially parallel to the longitudinal axis of the drive shaft 14. A plurality of gears 20, 21, 22 and 23 are firmly secured to the countershaft and rotated therewith. The gear 20 is continually in mesh with and constantly driven by the pinion 13 secured to the end of the power shaft. The gears 21, 22 and 23 are thus constantly rotated from the driving pinion 13. A gear 24 is carried by a fixed shaft (not shown) and is constantly in mesh and continually rotated by the gear 23 carried by the countershaft.

The movable gears 17 and 18 are each provided with a shifting collar 25 for engagement by the shifting arms, whereby the said gears may be moved in a direction longitudinally of the drive shaft. The pinion 13 is adapted to be constantly rotated by the movement of the power shaft 11, thus communicating rotative movement to the gear 20 and the countershaft 19 together with the gears 21, 22 and 23 carried by the countershaft, and the gear 24 which is constantly in mesh with the gear 23. The gears 17 and 18 are shown in Figure I as occupying their neutral positions, in which they are out of mesh with the gears carried by the countershaft, and so positioned that the power shaft rotates freely without communicating rotative movement of the drive shaft. When the movable gear 18 is moved forwardly into close engagement with the pinion 13, clutch mechanism (not shown) is provided for securing driving engagement between the adjacent faces of the gear 18 and the pinion 13, whereby the drive shaft is directly operated from the power shaft. If, however, the movable gear 18 is moved rearwardly a sufficient distance, it will be placed in mesh with the gear 21 carried by the countershaft, whereby rotative movement may be imparted to the drive shaft from the power shaft through the countershaft 19, and in the same direction as by engagement of the gear 18 with the driving pinion 13 but at a lower speed. If the movable gear 17 is moved in a forwardly direction, it is placed in mesh with the gear 22 carried by the countershaft, whereby rotative movement is imparted to the drive shaft through the counter shaft, in the same direction as the rotative movement imparted to the shaft by means of the gear 18 but at a lower rate of speed, as will be evident from comparing the relative size of the gears 17 and 22. If, however, the movable gear 17 is moved in the opposite direction, towards the rear, it will be placed in mesh with the gear 24 whereby rotative movement will be imparted to the drive shaft in a direction opposite to that in which it would be rotated under the several conditions previously described.

The mechanism, previously described comprises the conventional form of transmission mechanism commonly employed in automobiles, so arranged as to enable the drive shaft to be rotated at varying degrees of speed, and also making it possible to reverse the direction of rotation of the drive shaft when desired. It is obvious that serious difficulties would be encountered if through accident or otherwise the movable gears 17 and 18 should both be placed in mesh at the same time with one of their meshing gears. It is highly desirable, therefore, to provide mechanism which will positively retain one of these gears in neutral position and only permit movement of the first gear after the second gear has been returned to its neutral position. In order to best provide mechanism for properly controlling the movement of the movable gears 17 and 18, a pair of longitudinally slidable rods 27 and 28 are slidably mounted in oppositely positioned registering bearings 29, 30 and 30′ formed in the base portion of a supplemental casing. The longitudinally slidable rods are so positioned as to extend substantially parallel with each other at all times.

Each of these rods has firmly secured thereto a split collar 31, the parts of which are firmly clamped to each of the rods by means of a bolt 32, each of said collars 31 being provided with a downwardly extending arm 33 having forked ends 34 adapted to partially embrace one of the shifting collars 25 in such a manner as to control the movement of one of the movable gears. The split collars 31 together with the downwardly extending arms 33 and forks 34 are of similar construction and are so arranged that they each control one of the gears 17 and 18. Screw caps 37 are adapted to be firmly secured in the ends of the bearings 29 formed in the transmission casing for the purpose of properly enclosing the bearings 29 to prevent foreign matter from becoming lodged therein. An opening 42 is formed in the base portion of the supplemental casing for the purpose of permitting free movement of the collars 31 and their associated parts in a direction longitudinally of the casing.

The supplemental casing 40 is secured to the upper surface of the main transmission casing by means of bolts or other suitable fastening means which serve to firmly secure the casing 40 and the mechanism thereby securely in position relative to the operating parts of the transmission mechanism. A control lever 44 is pivotally mounted at 45 in the supplemental casing in such a manner that the control lever pivots freely on the point 45. The split collars 31 are oppositely positioned upon the rods 27 and 28, each of said collars being provided with a pair of inwardly extending ears 47, so positioned as to provide oppositely extending registering slots 48. The control lever 44 is provided with a squared portion 49 at its lower end, which is positioned within the space formed by the oppositely extending slots 48 in such a manner as to control the movement of the longitudinally slidable rods 27 and 28 by exerting pressure against the ears 47. The control member 44 is mounted in such a manner that the lower end thereof is capable of moving in a direction longitudinally of the casing, and is also capable of a slight movement in a transverse direction within the slots 48.

Each of the longitudinally movable rods is provided with a plurality of depressions or grooves 50 formed near one end thereof, and spaced from each other longitudinally of the rod for a purpose which will now be described.

In the present instance the grooves or depressions formed in each rod are three in number, and the several grooves are of substantially the same depth. Transversely extending openings 51 are formed within the supplemental casing in the same horizontal plane with the bearings 30' provided for the central portion of the longitudinal slidable rod, and communicating with the bearings 30'. A pawl mechanism 52 is adapted to be positioned within each of the transverse passages 51 in such a manner as to register with the grooves or depressions 50 formed in the outer side portions of the slidable rods 27 and 28. Each of the pawls 52 is adapted to slide freely within one of the passages 51, and each of the pawls is provided with a wedge shaped end portion, the point 54 of which is so positioned as to fit within one of the grooves or depressions formed in one of the longitudinally slidable rods. A screw cap 55 is threaded within the outer end of each of the passages 51 in such a manner as to entirely close the same, each of the caps 55 being provided with an inwardly projecting portion 56, and a pin 57 is passed through registering openings formed in the wall of the bearing 30' and the portion 56 of the cap 55 to firmly hold the cap 55 in position after it is threaded in the bearing 30'. Each of the pawls 52 is provided with a hollow interior portion within which is positioned a coiled compression spring 58, one end of which bears against the pawl 52, while the opposite end thereof seats upon the inwardly projecting portion 56 of the cap 55, in such a manner as to constantly force the pawl 52 into engagement with one of the longitudinally slidable rods. Each of the pawls 52 is provided with a pair of oppositely positioned grooves 59 extending longitudinally thereof and positioned in such a manner as to be guided by the oppositely extending end portions of the pin 57 in such a manner as to control the movement of the pawls and prevent their rotation within the passages 51.

Each of the grooves 50 is so positioned in the corresponding slidable rod as to determine the position of the slidable rod and the gear controlled thereby in its two positions of meshing engagement with the gear cooperating therewith, and in a neutral position intermediate the same. When the middle groove or depression of each rod is in engagement with the slidable pawls 52 cooperating therewith, the slidable rod is in its neutral position, as is also the slidable gear which is controlled thereby.

Positioned upon the inner side of each of the slidable rods 27 and 28, and located directly opposite the middle groove or depression 50 formed therein is a groove or depression 60. A pair of axially aligned passages 61 are formed in the supplemental casing portion, between the slidable rods 27 and 28, the axially aligned passages 61 being located in such a manner as to be in axial alignment with each other and with the previously described passages 51. Located within each of the axially aligned passages 61 is a slidable detent 62, which is adapted to fit within and slide freely in one of said passages in such a manner as to be free to extend within one of the grooves 60 formed upon the inner edge of one of the slidable rods. A vertical passage 63 is located substantially midway between the slidable rods 27 and 28, and positioned in such a manner as to communicate with the oppositely extending passages 61 located between the two rods. Slidably mounted within the passage 63 is a vertical plunger 64 provided with a reduced end portion 65, and having an enlarged head 66 slidable within an enlarged passage 67 which forms an extension of the vertical passage 63. A coiled spring 68 surrounds the plunger 64 and is positioned within the enlarged passage 67, so as to bear against a shoulder formed by the enlarged portion 66 of the plunger 64 in such a manner as to constantly exert pressure upon the plunger to urge the same in an upward direction. A vertical slot 69 is formed in the side of the enlarged head 66 of the plunger 64, and a set screw 70 is threaded within the casing in such a manner as to project within the slot 69 and limit the vertical movement of the plunger 64. While limiting the vertical movement of the plunger 64, the set screw 70 engaging with the slot 69, also prevents rotation of the plunger with respect to the casing within which the same is mounted. An opening 71 is formed in one side of the plunger casing and is positioned in such a manner as to be in registry with a spring pressed latch 72 carried by the plunger when the plunger is in its lowermost position. The spring pressed latch 72 carried by the plunger is controlled by a key 73, in such a manner as to be withdrawn within the plunger upon the insertion of the key, and to be pressed within the opening 71 in the casing, when the key is removed and the plunger is pressed downwardly to such a point as to bring the spring pressed latch 72 in registry with the opening 71. The sliding detents 62 are of such length as to be firmly held in position within the oppositely positioned grooves 60 formed in the sliding rods 27 and 28 when the reduced portion 65 of the vertical plunger 64 is positioned between the adjacent ends of the sliding detents. The sliding detents 62 are so proportioned as to permit one of the longitudinal slidable rods 27 and 28 to be moved from the position shown in Figure III when the reduced portion 65 of the vertical plunger 64 is removed from between the adjacent ends of the detents 62, but the detents are of such length that while permitting one of the slidable rods 27 and 28 to be moved from the position shown in Figure III upon the removal of the reduced portion 65 of the vertical plunger formed between the adjacent ends of the slidable detents, they will not permit the movement of both longitudinal slidable rods 27 and 28 from the position shown in Figure III, at the same time, and after the movement of one of those rods from the position shown in Figure III, the other rod will be retained in its neutral position until the first rod is returned to its neutral position and the second rod will be permitted to move. Consequently this construction makes it impossible to move either of the longitudinally slidable rods 27 and 28 and the gear controlled thereby from its neutral position while the other of the two longitudinally slidable rods is moved from its neutral position.

In the operation of the mechanism above described, the power shaft is driven from the engine (not shown) in the usual manner, whereby rotation is imparted to the pinion carried by the power shaft and to the countershaft, together with the several gears carried thereby. The drive shaft which is mounted in axial alignment with the power shaft carries the movable gears 17 and 18 thereon, in such a manner as to render them capable of movement in a direction axially of the drive shaft, and in opposite directions from their neutral positions. The movable gears 17 and 18 as shown in Figure I are occupying their neutral positions intermediate of the points where they are each adapted to be positioned when imparting rotative movement to the drive shaft. The movement of the longitudinally movable gears is controlled by the forked arms 34 rigidly secured to the corresponding longitudinally slidable rods 27 and 28, which rods as shown in Figure III, are in their neutral position when so placed that the ends of the detent members 62 are in engagement with the grooves or depressions 60 formed in each rod, and the slidable pawls 52 are in engagement with the intermediate groove or depression 50 formed in each rod.

The slidable rods are adapted to be selectively actuated by the control lever 44 by reason of pressure exerted by the lower squared portion 49 thereof, against the ears 47 extending inwardly from the split collars 31. By reason of the slight movement in a direction transverse of the transmission gearing which the lower end 49 of the control lever is capable, the lower end of the control lever 49 can be pushed in either direction transversely of the transmission casing from the position as shown in Figure I, so as to be in contact with the ears 47 carried by one only of the collars 31. Either one of the slidable rods may thus be moved in a longitudinal direction by means of the control lever, and when returned to its original position so that the oppositely extending slots 48 register with each other. The control lever may be shifted transversely and from that position the opposite sliding rod may be moved in a longitudinal direction. As the longitudinally slidable rods are moved axially in their bearings, the corresponding forked arms 34 are similarly displaced in a longitudinal direction within the transmission casing, thus communicating movement to the movable gears 17 and 18. Since in the neutral position of the slidable rods the oppositely extending ends of the detent sections 62 engage with the slots or grooves 60 formed in each of the slidable rods and these parts are so proportioned as to permit relative movement of the detent sections, when the reduced end portion 65 of the plunger 64 is raised, so that upon force being exerted upon one of the slidable rods for the purpose of displacing the same axially, either one of the slidable rods may be moved a sufficient distance in either direction to place the gear controlled thereby in mesh with either of the gears with which it is adapted to co-operate. When either of the slidable rods is thus displaced axially, the corresponding pawl 52 is forced outwardly out of engagement with the intermediate groove or depression 50, and when the slidable rod is moved a sufficient distance to place the gear controlled thereby in mesh with either of its co-operating gears, the rod is displaced a sufficient distance so that the slidable pawl 52 comes in registry with and engages with one of the outer grooves or depressions 50 formed in the slidable rod. When one of the longitudinal slidable rods has been displaced from its neutral position in the manner described above, it will be evident that the inner ends of the detent sections 62 are in substantial engagement so as to prevent the displacement of the other slidable rod from its neutral position until the first named slidable rod has been returned to its neutral position in order to permit the detent 62 engaging with the groove 60 formed in the second named slidable rod to be displaced therefrom a sufficient distance to permit movement of the second rod. The force exerted upon each of the slidable rods by the lower portion 49 of the control lever 44 is sufficient to urge the corresponding detent section 62 and pawl 52 outwardly from engagement with the corresponding grooves or depressions when force is exerted upon the lever 44 to move one of the slidable rods. When one of the slidable rods has been moved from its neutral position a sufficient distance to place one of the gears controlled thereby in mesh with either one of its intermeshing gears, the slidable rod thus displaced is retained in its new position by means of the slidable pawl 52 engaging with the corresponding outer groove or depression 50 formed in the slidable rod until such time as the control lever 44 is actuated to return the rod to its neutral position.

Whenever it is desired to leave the car and prevent its use by any unauthorized person, the control lever 44 is set in such a manner as to place both of the longitudinally slidable rods in their neutral positions, as illustrated in Figure III, and pressure is exerted upon the enlarged head 66 of the plunger 64 in such a manner as to press the plunger downwardly, thereby forcing the reduced portion 65 thereof between the inner ends of the detent section 62, and when the plunger is thus forced downwardly, the spring pressed latch 72 carried by the plunger head automatically springs outwardly into the opening 71 formed in the casing in such a manner as to lock the plunger 64 in its lower position, as shown in Figure IV, and thus place the reduced portion 65 of the plunger between the opposite ends of the detent sections 62 in such a manner as to prevent either of these detent sections from being removed from the grooves or depressions 60 formed in the inner sides of the longitudinally slidable rods and thus positively prevent any movement of either of the longitudinally slidable rods, such as would be necessary for placing one or the other of the slidable gears 17 and 18 in mesh with their co-operating gears. In this way the operating mechanism is positively locked so as to prevent power from being communicated to the drive shaft of the automobile. When it is again desired to operate the mechanism, the key 73 is inserted within the enlarged portion 66 of the plunger, and this key serves to operate the spring pressed latch 72 in such a manner as to withdraw the same from the opening 71 formed in the casing and permit the plunger 64 to be raised by the coiled spring 68, which as previously described is positioned within the casing in such a manner as to bear against the enlarged head portion 66 of the plunger and urge the same upwardly to such an extent as to withdraw the reduced portion 65 of the plunger from between the opposite ends of the detent sections 62.

It will be seen from the above description that the movable gears are controlled by the longitudinally slidable rod, and that means are provided for releasably retaining each of the longitudinally slidable rods in neutral position, and in each of its positions wherein the gear controlled thereby is in engagement with one of its intermeshing gears. Means is also provided for positively locking both of the slidable rods in their neutral positions in such a manner as to positively prevent their disengagement therefrom until the locking means for retaining them in their neutral positions is released.

While we have shown and described in considerable detail a specific embodiment of our invention, it is to be understood that this showing and description is illustrative only and for the purpose of rendering our invention more clear, and that we do not regard the invention as limited to the details of construction illustrated or described, nor any of them, except in so far as we have included such limitations within the terms of the following claims, in which it is our intention to claim all novelty inherent in our invention broadly as well as specifically.

Having thus described our invention, what we claim as new and desired to secure by Letters Patent is:

1. In a transmission mechanism, a casing, a shiftable member therein having a stop, a pawl slidably mounted in said casing, a spring urging said pawl into engagement with the stop, means threaded into the casing for forming an abutment for said spring and means for preventing rotation of said pawl, and said threaded means.

2. In a transmission mechanism, a casing, a shiftable rod therein having a stop, a pawl slidably mounted in said casing transversely of said rod and adapted to engage the stop, a member rigid upon said casing opposite said pawl, a spring between said member and said pawl, and means engaging said casing, said member and said pawl for preventing rotation of said pawl and said member.

3. In a transmission mechanism, a casing and a shiftable rod mounted for longitudinal movement therein, a bearing extending transversely of said rod, a pawl mounted to slide in said bearing and adapted to engage the rod in a notch formed therein, a cap detachably secured to said bearing, a spring between said cap and said pawl, and a pin extending through the wall of said bearing and projecting into engagement with the pawl and cap to prevent the turning of each.

4. In a transmission mechanism, a casing, a shiftable member within the casing provided with a notch, a recessed pawl slidable within the casing adapted to engage the shiftable member within the notch, a spring within the recessed pawl adapted to hold it in yielding engagement with said shiftable member, a detachable member forming an abutment for the spring and projecting into the pawl, and means secured to said casing and engaging said member and said pawl for preventing rotation of said member and said pawl.

5. In a transmission mechanism, a casing, a shiftable member within the casing having a notch formed therein, a recessed pawl slidable within the casing and adapted to engage the shiftable member within the notch, a spring adapted to hold the pawl in yielding engagement with the shiftable member, a cap forming a seat for the spring and having a portion projecting into the pawl, and a pin adapted to prevent rotation of the pawl upon the cap.

In testimony whereof, we affix our signatures.

ANTOINE G. SENSTIUS.
WILLIAM F. HARRINGTON.